United States Patent
Cheramie

[11] Patent Number: 5,671,954
[45] Date of Patent: Sep. 30, 1997

[54] SWIVEL CONNECTOR FOR NOZZLE AND GARDEN HOSE

[76] Inventor: Leon J. Cheramie, 1208 Huey P. Long Ave., Gretna, La. 70053

[21] Appl. No.: 571,387

[22] Filed: Dec. 13, 1995

[51] Int. Cl.[6] ........................................ F16L 28/08
[52] U.S. Cl. ........................ 285/281; 285/397; 285/168; 285/272
[58] Field of Search ........................... 285/281, 278, 285/772, 168, 370, 397

[56] References Cited

U.S. PATENT DOCUMENTS

| | | | |
|---|---|---|---|
| 56,284 | 7/1866 | Smitv et al. | 285/168 |
| 203,307 | 5/1878 | Work | 285/278 |
| 272,975 | 10/1883 | Stuffee | 285/272 |
| 590,532 | 9/1897 | Steven | 285/272 |
| 664,479 | 12/1900 | Nugnson | 285/168 |
| 1,729,483 | 9/1929 | Koch | 285/168 |
| 2,709,624 | 5/1955 | MacChesney | 285/397 |
| 3,722,924 | 3/1973 | Bjornsen | 285/370 |
| 3,788,676 | 1/1974 | Lossie | 285/397 |
| 3,900,221 | 8/1975 | Fouts | 285/168 |
| 4,478,438 | 10/1984 | Elorriaga, Jr. | 285/276 |
| 4,676,241 | 6/1987 | Webb et al. | 285/168 |
| 4,869,534 | 9/1989 | Ketcham et al. | 285/24 |
| 5,165,734 | 11/1992 | Smith | 285/276 |
| 5,316,351 | 5/1994 | Czimny et al. | 285/276 |
| 5,507,535 | 4/1996 | McKamey et al. | 285/370 |

FOREIGN PATENT DOCUMENTS

| | | | |
|---|---|---|---|
| 2309087 | 12/1990 | Japan | 285/397 |
| 1296783 | 3/1987 | U.S.S.R. | 285/397 |
| 241925 | 10/1925 | United Kingdom | 285/281 |

*Primary Examiner*—Eric K. Nicholson
*Attorney, Agent, or Firm*—Joseph N. Breaux

[57] ABSTRACT

A swivel connector for connecting a garden hose with a water receiving device including an inner ring seal member having a central tubular portion and a first and second seal flange extending from either peripheral end of the central portion, each of the first and second flanges having a resilient outer sealing surface that fits within an inner peripheral groove provided within a first and second female swivel member. The first female swivel member has a conventional female hose fitting. The second female swivel member includes a connecting mechanism for forming a fluid connection with a water flow receiving device. The connecting mechanism may take the form of a conventional male hose fitting or an integrally formed connection with a water flow receiving device such as a spray nozzle.

1 Claim, 1 Drawing Sheet

U.S. Patent
Sep. 30, 1997
5,671,954
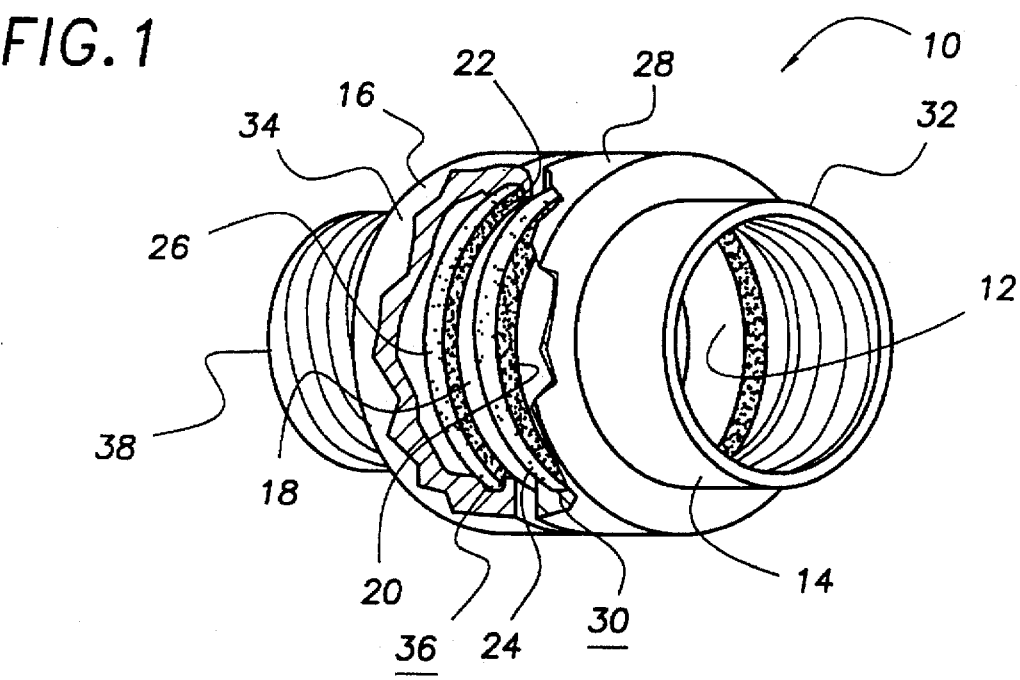
FIG. 1
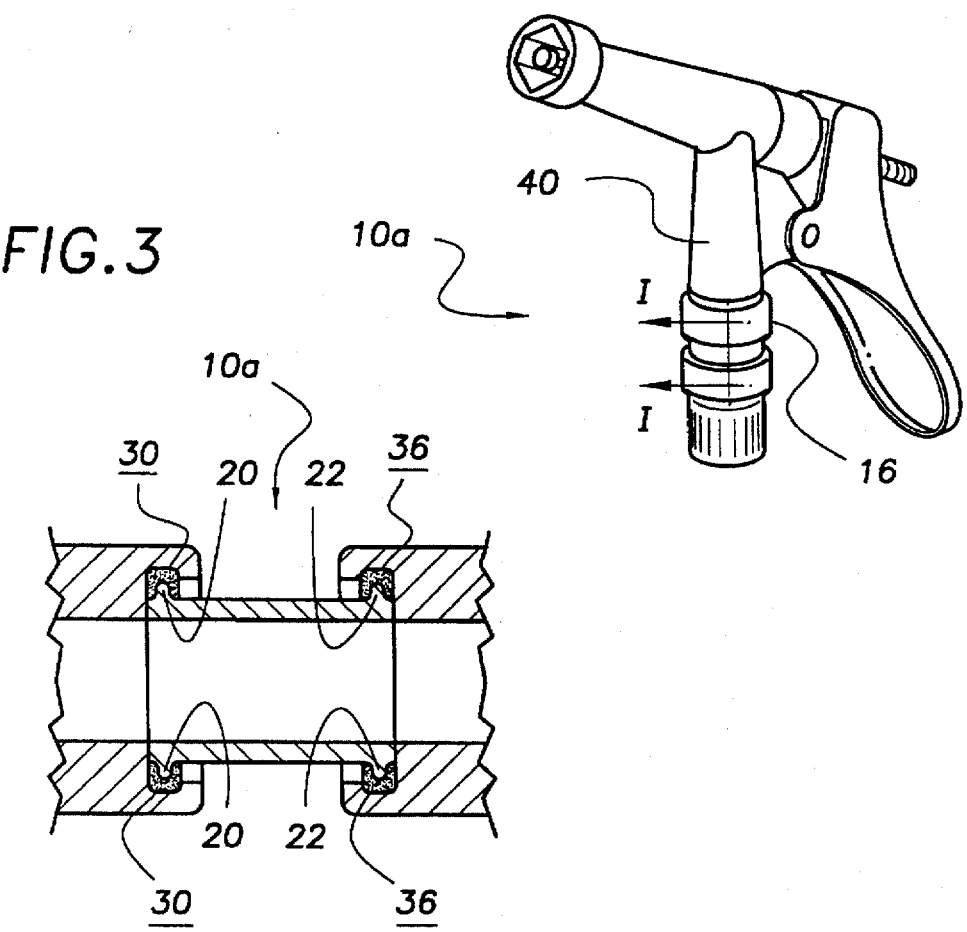
FIG. 2
FIG. 3

SWIVEL CONNECTOR FOR NOZZLE AND GARDEN HOSE

TECHNICAL FIELD

The present invention relates to connectors used for attaching water flow receiving devices, such as additional lengths of garden hose and spray nozzles, to a conventional garden hose and more particularly to connectors used for attaching water flow receiving devices, such as additional lengths of garden hose and spray nozzles, to a conventional garden hose that have a swivel function that allows the attached water flow receiving device to rotate with respect to the convention garden hose.

BACKGROUND ART

Twisting of garden hoses makes working with a garden hose more exhausting than necessary. In particular, older individuals enjoy gardening may be deprived of the pastime because of the exhausting work that is often entailed in wrestling with the garden hose. At least a portion of the wrestling could be reduced or eliminated if the spray nozzle attached to the garden hose could swivel with respect to the male hose fitting at the end of the garden hose. It would also be desirable to have a swivel connector for connecting multiple lengths of garden hose to prevent twisting and kinking of the garden hose and reduce the amount of time and energy required to untangle extended lengths of garden hose.

GENERAL SUMMARY DISCUSSION OF INVENTION

It is thus an object of the invention to provide a swivel connector for connecting water flow receiving devices to the end of a conventional garden hose.

It is a further object of the invention to provide a swivel connector for connecting multiple lengths of garden hose.

It is a still further object of the invention to provide a swivel connector that has a spray nozzle attached to the end thereof that is attachable to the male end fitting of a garden hose in a manner such that the spray nozzle rotates with respect to the male hose fitting.

Accordingly, a swivel connector for connecting a garden hose with a water receiving device is provided. The swivel connector includes an inner ring seal member having a central tubular portion and a first and second seal flange extending from either peripheral end of the central portion, each of the first and second flanges having a resilient outer sealing surface; a first female swivel member having a first tubular portion having a first end having a first inner peripheral groove sized to receive, and having slidingly sealingly disposed therein, the first seal flange of the inner ring seal in a manner to form a fluid pathway between the central tubular portion of the inner ring seal and the first tubular portion of the first female swivel member, and a second end having a hose connecting mechanism in connection therewith for forming a fluid connection with the male fitting end of a conventional water hose; and a second female swivel member having a second tubular portion having a third end having a second inner peripheral groove sized to receive, and having slidingly sealingly disposed therein, the second seal flange of the inner ring seal in a manner to form a fluid pathway between the central tubular portion of the inner ring seal and the second tubular portion of the second female swivel member, and a fourth end having a connecting mechanism for forming a fluid connec-tion with a water flow receiving device. The connecting mechanism may take the form of a conventional male hose fitting or an integrally formed connection with a water flow receiving device such as a spray nozzle. The swivel hose connector is preferably made of non-corrodible plastic but may be constructed of metals such as brass or combinations of metals and plastic. The resilient outer sealing surface is preferably a synthetic rubber.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 is a perspective view of a first exemplary embodiment of the swivel connector of the present invention have a central outer wall cut away to show the first and second seal flanges installed within the first and second inner peripheral grooves.

FIG. 2 is a second exemplary embodiment of the swivel connector of the present invention showing a conventional spray nozzle integrally formed with the second tubular portion of the second female swivel member.

FIG. 3 is a cross-section detail view of the swivel connector of FIG. 2 along line I—I showing the first and second seal flanges installed within the first and second inner peripheral grooves.

EXEMPLARY MODE FOR CARRYING OUT THE INVENTION

FIG. 1 is a perspective view showing a first exemplary swivel connector of the present invention generally designated by the numeral 10. Swivel connector 10 includes an inner ring seal member 12; a first female swivel member 14; and a second female swivel member 16.

Inner ring seal member 12 has a plastic central tubular portion 18 and a first and second seal flange 20,22 that extend from either peripheral end of central tubular portion 18. Each of first and second seal flanges 20,22 has a resilient outer sealing surface 24,26, respectively, constructed from compressible neoprene rubber.

First female swivel member 14 is constructed from plastic and has a first tubular portion 28 having a first inner peripheral groove 30 sized to slidingly receive first seal flange 20. First seal flange 20 is installed within first inner peripheral groove 30 by compressing resilient outer sealing surface 24 and snapping first seal flange into position. Once in place resilient outer surface decompresses forming a sliding seal against first inner peripheral groove 30. A conventional female hose fitting 32 is provided at the opposite end of first female swivel member 14.

Second female swivel member 16 is also constructed from plastic. Second female swivel member 16 includes a second tubular portion 34 having a second inner peripheral groove 36 sized to slidingly receive second seal flange 22. Second seal flange 22 is installed within second inner peripheral groove 36 by compressing resilient outer sealing surface 26 and snapping second seal flange 22 into position. Once in place resilient outer sealing surface 26 decompresses forming a sliding seal against second inner peripheral groove 36. A conventional male hose fitting 38 is provided at the opposite end of second female swivel member 14.

FIG. 2 is a perspective view of a second exemplary swivel connector of the present invention, generally designated by the numeral 10a. Swivel connector 10a is identical to swivel connector 10 of FIG. 1 except that a conventional spray nozzle 40 is integrally formed with second female swivel member 16 in place of conventional male hose fitting 38 (FIG. 1). FIG. 3 is a cross-sectional detail view of swivel connector 10a showing first and second seal flanges 20,22 installed within first and second inner peripheral grooves 30,36.

Use of swivel connectors 10,10a is now described with general reference to FIGS. 1-3. Both swivel connectors 10 and 10a may be secured to the male fitting end of a conventional garden hose by threading female hose fitting 32 onto the male fitting of the garden hose. Once this is accomplished spray nozzle 40 may be utilized in the conventional fashion with the added feature of rotation with respect to the male fitting of the garden hose.

When swivel connector 10 is utilized, an additional length of garden hose may be secured to swivel connector 10 by threading the female fitting of the conventional garden hose onto male hose fitting 38. Swivel connector 10 may also be connected between the faucet and a length of garden hose if desired.

It can be seen from the preceding description that a swivel connector for connecting water flow receiving devices to the end of a conventional garden hose has been provided that may be utilized to connect multiple lengths of garden hose; and that has a spray nozzle attached to the end thereof that is attachable to the male end fitting of a garden hose in a manner such that the spray nozzle rotates with respect to the male hose fitting.

It is noted that the embodiment of the swivel connector for connecting a garden a hose with a water receiving device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A swivel connector for connecting a garden a hose with a water receiving device comprising:

an inner ring seal member having a central tubular portion and a first and second seal flange extending from either peripheral end of said central portion, said first seal flange having a first resilient outer sealing surface, said second seal flange having a second resilient outer sealing surface;

a first female swivel member having a first tubular portion having a first end having a first inner peripheral groove sized to receive, and having slidingly sealingly disposed therein, said first seal flange of said inner ring seal member in a manner to form a fluid pathway between said central tubular portion of said inner ring seal member and said first tubular portion of said first female swivel member, and a second end having a hose connecting mechanism in connection therewith for forming a fluid connection with a male fitting end of a water hose; and a second female swivel member having a second tubular portion having a third end having a second inner peripheral groove sized to receive, and having slidingly sealingly disposed therein, said second seal flange of said inner ring seal member in a manner to form a fluid pathway between said central tubular portion of said inner ring seal member and said second tubular portion of said second female swivel member, and a fourth end having a connecting mechanism for forming a fluid connection with a water flow receiving device;

said first resilient outer sealing surface being sufficiently compressible to allow said first seal flange to be positioned into said first inner peripheral groove and sufficiently resilient to decompress to form a sliding seal against said first inner peripheral groove, said second resilient outer sealing surface being sufficiently compressible to allow said second seal flange to be positioned into said second inner peripheral groove and sufficiently resilient to decompress to form a sliding seal against said second inner peripheral groove.

* * * * *